(12) United States Patent
Willis

(10) Patent No.: US 9,082,347 B2
(45) Date of Patent: Jul. 14, 2015

(54) ILLUMINATION MODULATION TECHNIQUE FOR MICRODISPLAYS

(75) Inventor: Thomas E. Willis, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1801 days.

(21) Appl. No.: 11/038,292

(22) Filed: Jan. 19, 2005

(65) Prior Publication Data

US 2006/0158465 A1      Jul. 20, 2006

(51) Int. Cl.
| | |
|---|---|
| *G09G 5/10* | (2006.01) |
| *G09G 3/34* | (2006.01) |
| *H04N 9/31* | (2006.01) |
| *G09G 3/20* | (2006.01) |

(52) U.S. Cl.
CPC ............... *G09G 3/34* (2013.01); *H04N 9/3114* (2013.01); *H04N 9/3123* (2013.01); *G09G 3/2014* (2013.01); *G09G 2310/0235* (2013.01); *G09G 2320/0276* (2013.01)

(58) Field of Classification Search
CPC ..... G09G 3/36; G09G 3/2014; G09G 3/2018; G09G 2300/0842; G09G 2300/0439; G09G 2300/0809
USPC .................................. 345/204, 690–693, 691
See application file for complete search history.

(56) References Cited

U.S. PATENT DOCUMENTS

| | | | | |
|---|---|---|---|---|
| 5,245,328 | A * | 9/1993 | Garrett .......................... | 345/696 |
| 5,298,915 | A * | 3/1994 | Bassetti, Jr. .................. | 345/696 |
| 5,313,224 | A * | 5/1994 | Singhal et al. ................. | 345/89 |
| 5,614,921 | A * | 3/1997 | Conner et al. .................. | 345/85 |
| 5,745,193 | A * | 4/1998 | Urbanus et al. ............... | 348/771 |
| 6,232,963 | B1 * | 5/2001 | Tew et al. ...................... | 345/204 |
| 6,300,924 | B1 * | 10/2001 | Markandey et al. ............ | 345/84 |
| 6,362,835 | B1 * | 3/2002 | Urbanus et al. ............... | 345/692 |
| 6,377,234 | B1 * | 4/2002 | Nogawa .......................... | 345/89 |
| 6,441,829 | B1 * | 8/2002 | Blalock et al. ................ | 345/690 |
| 6,583,775 | B1 * | 6/2003 | Sekiya et al. ................... | 345/76 |
| 6,747,669 | B1 * | 6/2004 | Yamaguchi et al. .......... | 345/690 |
| 7,106,350 | B2 * | 9/2006 | Baba et al. ..................... | 345/691 |
| 7,173,639 | B2 * | 2/2007 | Huang ........................... | 345/691 |
| 7,248,253 | B2 * | 7/2007 | Willis ............................ | 345/204 |
| 2007/0085819 | A1 * | 4/2007 | Zhou et al. ..................... | 345/107 |

* cited by examiner

*Primary Examiner* — Abbas Abdulselam
(74) *Attorney, Agent, or Firm* — Trop, Pruner & Hu, P.C.

(57) ABSTRACT

A projection display may use pulse width modulation wherein the duty cycle may be varied. This duty cycle variation may improve bit depth in some embodiments. For example, on alternate frames, the duty cycle may be reduced by a given percentage.

24 Claims, 6 Drawing Sheets

ILLUMINATION MODULATION TECHNIQUE FOR MICRODISPLAYS

BACKGROUND

This invention relates generally to microdisplays.

A projection display system typically includes one or more spatial light modulators (SLMs) that modulate light for purposes of producing a projected image. The SLM may include, for example, a liquid crystal display (LCD) such as a high temperature polysilicon (HTPS) LCD panel or a liquid crystal on silicon (LCOS) microdisplay, a grating light valve or a MEMs (where "MEMs" stands for micro-electro-mechanical devices) light modulator such as a digital mirror display (DMD) to modulate light that originates from a lamp of the projection display system.

In typical projection display systems, the lamp output is formatted with optics to deliver a uniform illumination level on the surface of the SLM. The SLM forms a pictorial image by modulating the illumination into spatially distinct tones ranging from dark to bright based on supplied video data. Additional optics then relay and magnify the modulated illumination pattern onto a screen for viewing.

The SLM typically includes an array of pixel cells, each of which is electrically controllable to establish the intensity of a pixel of the projected image. In some projection display systems, SLMs are transmissive and in others, they are reflective. For the purposes of simplification, the discussion will address reflective SLMs. An SLM may be operated so that each pixel has only two states: a default reflective state which causes either a bright or a dark projected pixel and a non-default reflective state which causes the opposite projected pixel intensity. In the case of an LCOS SLM, the pre-alignment orientation of the LC material and any retarders in the system determine whether the default reflective state is normally bright or normally dark. For the purposes of simplification, the discussion will denote the default reflective state as normally bright, i.e., one in which the pixel cell reflects incident light into the projection lens (the light that forms the projected image) to form a corresponding bright pixel of the projected image. Thus, in its basic operation, the pixel cell may be digitally-controlled to form either a dark pixel (in its non-default reflective state) or a bright pixel (in its default reflective state). In the case of a DLP SLM, the states may represent the pixel in a co-planar position to the underlying substrate.

Although its pixels are operated digitally, the above-described SLM may also be used in an application to produce visually perceived pixel intensities (called "gray scale intensities") between the dark and bright levels. For such an application, each pixel may be controlled by pulse width modulation (PWM), a control scheme that causes the human eye to perceive gray scale intensities in the projected image, although each pixel cell still only assumes one of two states at any one time. The human visual system perceives a temporal average of pixel intensity when the PWM control operates at sufficiently fast rates.

In the PWM control scheme, a pixel intensity (or tone) is established by controlling the time that the pixel cell stays in its reflective state and the time that the pixel cell remains in the non-reflective state during an interval time called a PWM cycle. This type of control is also referred to as duty cycle control in that the duty cycle (the ratio of the time that the pixel cell is in its reflective state to the total time the pixel cell is in its non-reflective and reflective states) of each PWM cycle is controlled to set the pixel intensity. A relatively bright pixel intensity is created by having the pixel cell spend a predominant proportion of time in its reflective state during the PWM cycle, while a relatively dark pixel intensity is created by having the pixel cell spend a predominant amount of time in its non-reflective state during the PWM cycle.

The quality of the projected image typically is a function of the number of possible gray scale intensities, also called the "bit depth." For the above-described PWM control scheme, a bit depth of "N" means that the PWM cycle is divided into $2^N$ time consecutive and non-overlapping time segments. For a particular PWM cycle, each of the time segments in which the pixel cell is in its reflective state contributes to the overall luminance of the corresponding pixel. Each time segment of the PWM cycle typically corresponds in duration to the cycle of a clock signal. Thus, the larger the number of time segments (i.e., the greater the number of gray scale intensities), the higher the frequency of this clock signal, thereby requiring a high speed clock to form the pixel gray scale or tonal range. Power consumption is also a function of this clock frequency and also increases with bit depth.

Other factors may increase the clock rate needed for a particular bit depth. For example, for a three SLM LCD panel projection system (one SLM for each primary color), the PWM cycle may have a period that is equal to one half of the video data's field time (typically 1/60 second). Opposite drive voltage polarities are needed in LCD systems to prevent voltage bias accumulation. This is well known for liquid crystal display systems. Thus, LCD SLM devices require two PWM cycles in each video data field. This doubles the clock rate requirement.

For a two SLM panel projection system where one of the SLM panels is temporally shared by two primary colors, the video frame time must be split to allocate PWM cycles to each primary color, thereby increasing the needed PWM clock rate if the same bit depth is maintained in all colors.

For a one SLM panel projection system with an SLM panel temporally shared by all three primary colors, the video frame time must be further subdivided. For an LCOS SLM the video frame time would be divided into six PWM cycles, a pair for each primary color. The PWM clock period may have an even shorter duration when the unequal length PWM cycles are needed to adjust the display white point. Since common projection lamps are rich in blue and weak in red output, it is generally necessary to devote longer portions of the video frame time to red to achieve white balance. This necessitates the PWM clock period to be increasingly small and the clock frequently and power consumption to be increasingly high.

Thus, there is a need for modulation techniques that improve bit depth of microdisplays.

DETAILED DESCRIPTION

Figure 1:
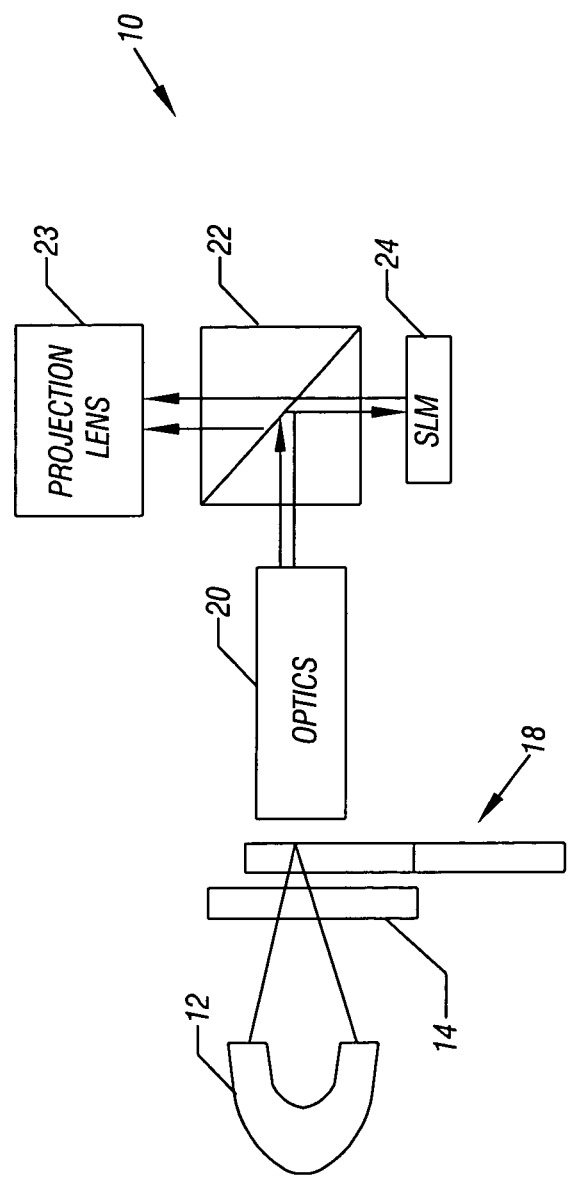
FIG. 1 is a schematic diagram of a projection display system according to an embodiment of the invention.

Referring to FIG. 1, a projection display system 10 in accordance with an embodiment of the invention includes one or more spatial light modulators (SLMs) 24 (one shown in FIG. 1) that modulate impinging light to produce a projected composite, color optical image (herein called "the projected image"). The SLM 24 may be a liquid crystal (LC) SLMs, a tilt-mirror SLM, or a MEMs-type SLM, depending on the particular embodiment of the invention. Unless otherwise stated, embodiments described herein use LC SLMs for purposes of simplifying the description. However, it is understood that other SLMs, such as grating light valve, HTPS, or other technology SLMs, may be used, in other embodiments of the invention. Furthermore, unless otherwise noted below, the projection display system 10 includes a single SLM 24, for purposes of simplifying the following description, although other projection systems that have multiple SLMs may be alternatively used and are within the scope of the appended claims.

In accordance with some embodiments of the invention, the projection display system 10 includes a lamp 12 (a mercury lamp, for example) that produces a broad visible spectrum illumination beam that passes through an ultraviolet/infrared (UV/IR) filter 14 of the system 10. The light passing from the filter 14, in turn, passes through a rotating color wheel, such as a color wheel 18 that is also depicted in FIG. 2.

Figure 2:
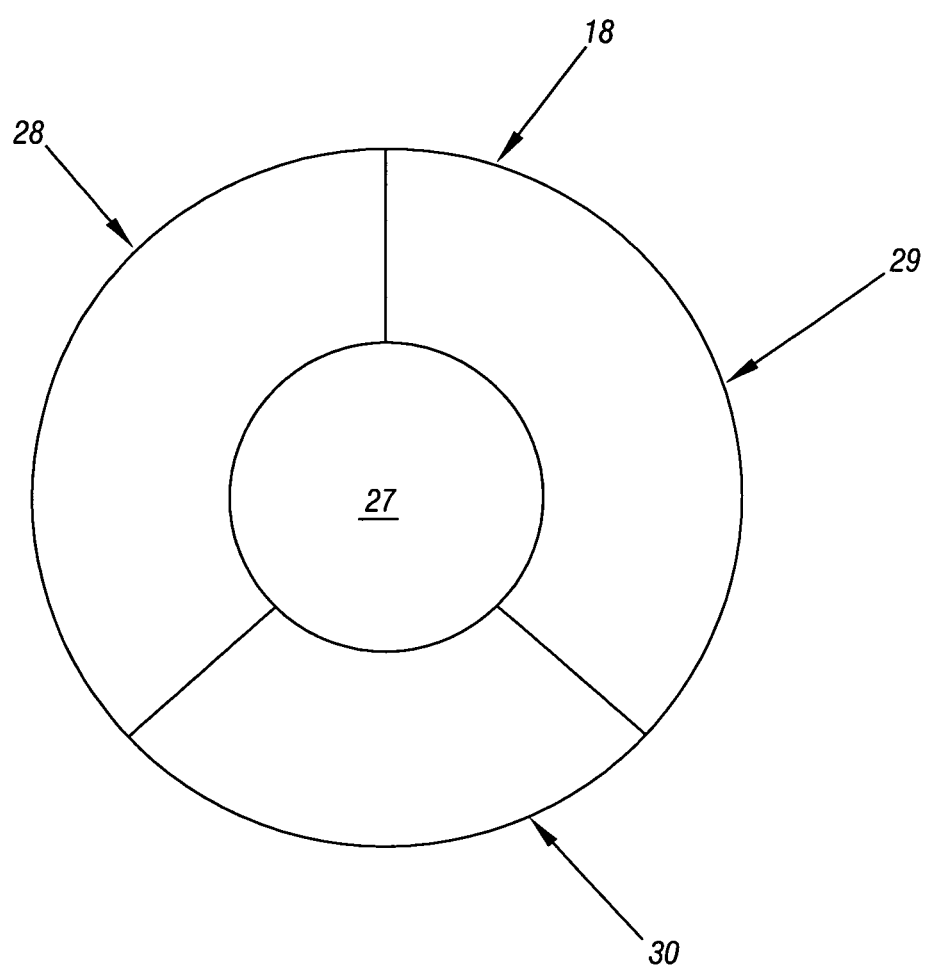
FIG. 2 is a view of a light impinging face of a color filter wheel.

Referring to FIG. 1 in conjunction with FIG. 2, a function of the color wheel 18 is to serve as a time-varying wavelength filter to allow certain wavelengths of light to pass therethrough at the appropriate times so that the filtered light may be modulated by the SLM 24 to produce the projected image.

More specifically, in some embodiments of the invention, the projection display system 10 may be a shared color system, a system in which, for example, the SLM 24 modulates red, followed by green, followed by blue light. Thus, the SLM 24 is temporally shared to modulate different primary color beams.

In such a shared color projection display system, a light impinging face of the color filter wheel 18 may be, as depicted in FIG. 2, generally divided so that one arcuate region 28 of the wheel 18 serves as a wavelength filter to select certain wavelengths of light and other arcuate regions 29 and 30 of the wheel 18 select other wavelengths of light. The light from the UV/IR filter 14 (FIG. 1) is incident on a "spot" on an outer circular track of the color wheel 18, a track that coincides with the arcuate regions 28, 29 and 30.

A non light-filtering and central interior region 27 of the color wheel 18 does not receive the beam from the UV/IR filter 14. The region 27 may receive a spindle (not shown) that is connected to a motor (not shown) for purposes of rotating the wheel 18 to filter light from UV/IR filter 14 via one of the arcuate regions 28, 29 and 30. Thus, the light beam that is incident upon the color filter wheel 18 is eccentric with respect to the center of the wheel 18 so that the light beam is incident on one of the arcuate regions 28, 29 and 30 at any one time as the wheel 18 rotates. Various techniques (techniques using optical sensors, optical shaft encoders on the shaft of the motor, etc.) may be used to synchronize the rotation of the color wheel 18 with the modulation that is performed by the SLMs 24. More specifically, in some embodiments of the invention (further described below), the projection display system 10 includes a synchronizer (not shown) to synchronize the rotation of the color wheel so that the portion of the color wheel through which the light beam passes is more opaque when the SLM 24 is displaying darker tones.

As a more specific example of an embodiment of the color wheel, the arcuate region 28 of the color wheel 18 may be a magenta segment that allows red light to pass therethrough. For the phase of the color wheel's rotation in which the light from the UV/IR filter 14 passes through the arcuate region 28, the projection display system 10 (via a polarizing beam splitter 22 (FIG. 1)) directs the red light beam to the SLM 24 so that the SLM 24 modulates the red light. The arcuate region 29 of the color wheel may be a green segment that allows green light to pass. For the phase of the color wheel's rotation in which the light from the UV/IR filter 14 passes through the arcuate region 29, the projection display system 10 (via the beam splitter 22) directs the green light to the SLM 24. For the phase of the color wheel's rotation in which the light from the UV/IR filter 14 passes through the arcuate region 30, the projection display system 10 (via the beamsplitter 22) directs blue light to the SLM 24.

As previously stated, the single-SLM configuration that is depicted in FIG. 1 is for purposes of example only. Thus, the projection display system 10 may be replaced by another projection display system, in other embodiments of the invention, such as a projection display system that includes three SLMS, one for each primary color (red, green and blue, for example) of the projected image. As another example, in some embodiments of the invention, red, green and blue light may be temporally shared on an SLM in a two SLM display projection system. Therefore, many variations are possible and are within the scope of the appended claims.

Referring to FIG. 1, among its other components, the projection display system 10 includes homogenizing and beam shaping optics 20 that further shape and collimate the light that exits the color wheel 18, prepolarizes and directs the resultant beam to the polarizing beam splitter 22. The polarizing beam splitter (PBS) 22 separates the light from the color wheel 18 based on polarization. More specifically, assuming the single-SLM configuration described above, the polarizing beam splitter 22 directs the different color sub-bands of light (at different times) to the SLM 24. Once modulated by the SLMs 24, the polarizing beam splitter 22 directs the modulated beam through projection lenses 23 for purposes of forming the projected image.

Depending on the particular embodiment of the invention, the SLM 24 may be a digital mirror device (DMD), liquid crystal display (LCD) device, or other pixelated SLM. In some embodiments of the invention, the SLM 24 is a liquid crystal on silicon (LCOS) device that includes a liquid crystal layer that is formed on a silicon substrate in which circuitry (decoders, control circuits and registers, for example) to control and operate the device is fabricated.

Figure 3:
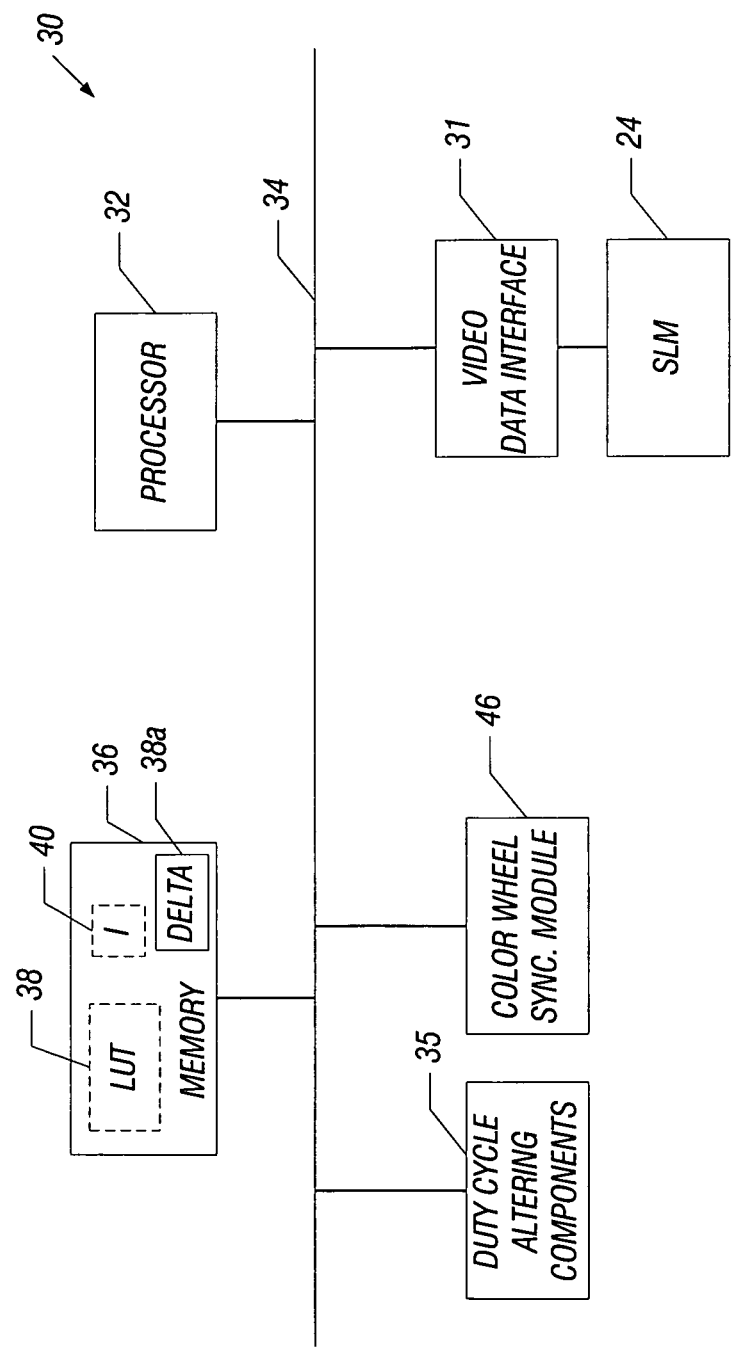
FIG. 3 is a block diagram of an electrical system of the projection display system according to an embodiment of the invention.

In some embodiments of the invention, an electrical system 30 for the projection display system 10 (FIG. 1) may have a general structure that is depicted in FIG. 3. Referring to FIG. 3, the electrical system 30 may include a processor 32 (one or more microcontrollers or microprocessors, as examples) that is coupled to a system bus 34. The processor 32 communicates over the system bus 34 with a memory 36 (a flash memory, for example) of the electrical system 30. The memory 36 stores instructions 40 to cause the processor 32 to perform one or more of the techniques that are described herein, as well as a look-up table (LUT) 38.

In some embodiments of the invention, the projection display system 10 (FIG. 1) operates the pixel cells of the SLM 24 in a digital fashion, in that each pixel cell at any one time is either in a reflective state or a non-reflective state. Gray scale intensities are achieved by pulse width modulation (PWM), a modulation technique that controls the optical behavior of the pixel cell during an interval of time called a PWM cycle to control the intensity of the corresponding pixel of the projected image. The PWM control regulates the amount of time that a particular pixel cell is in its reflective and non-reflective states during a PWM cycle for purposes of establishing a certain pixel intensity. The amount of time that the pixel cell is in each reflectivity state for a given pixel intensity value is established by the LUT 38, in some embodiments of the invention. It is noted that in some embodiments of the invention, the LUT 38 may represent a collection of LUTs, one for each primary color. For purposes of simplifying the discussion herein, only one LUT is assumed, unless otherwise stated. The LUT 38 indicates a PWM duty cycle for each potential pixel intensity value.

Among its other features, the electrical system 30 may include a color wheel synchronization module 46 and a video data interface 31 that are coupled to the system bus 34. The color wheel synchronization module 46 can serves to assist in ensuring that the physical position of the color wheel 18 is aligned with the start of a PWM timing cycle. The video data interface 31 receives pixel intensity data that is mapped through LUT 38 to specify per pixel PWM data (to drive the SLM 24).

In some embodiments of the invention, the LUT 38 includes a corresponding duty cycle entry for each unique pixel intensity value. The duty cycle entry indicates a duration that the pixel cell remains in its default reflective state during the PWM cycle to produce the desired pixel intensity. The pixel cell remains in the non-default reflective state during the remainder of the PWM cycle. In some embodiments of the invention, each table entry indicates a number of pulse width modulation (PWM) counts, or clock cycles, for each intensity value. These are the number of clock cycles that the pixel cell needs to remain in its default reflective state. For the remaining clock cycles of the PWM cycle (having a fixed duration, for example), the pixel cell is in its non-default reflective state. The PWM clock counts may be executed with the non-reflective portion first and the reflective portion second or with the reflective portion first and the non-reflective portion second. In other embodiments, fractions of the total reflective and non-reflective clock counts may be alternated during a PWM cycle. In any execution strategy, the LUT-prescribed-time proportion remains consistent relative to the whole PWM cycle time.

Figure 4:
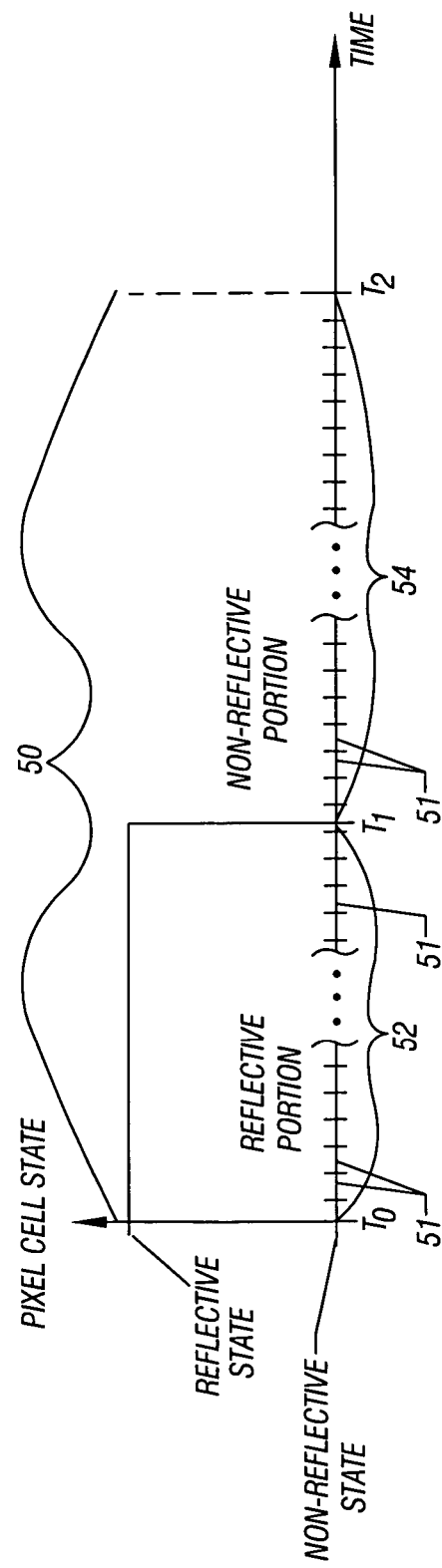
FIG. 4 is an illustration of a pulse width modulation control technique for a pixel cell according to an embodiment of the invention.

Referring to FIG. 3 in conjunction with FIG. 4, the processor 32, for a given video data value, retrieves the corresponding PWM count from the LUT 38. The retrieved value, in turn, determines the number of PWM clock counts that, in turn, govern the duration of a reflective portion 52 of a PWM cycle 50. The remaining counts form a non-reflective portion 54 (i.e., the remaining portion) of the PWM cycle 50. Stated differently, the PWM cycle 50 may be viewed as being formed from consecutive and non-overlapping time segments 51, each of which has the duration of a specified number of clock cycles. In some embodiments of the invention, the pixel cell, at the beginning of the PWM cycle 50, is in the non-reflective state. The number of PWM counts determine the number (if any) of time segments 51 from time $T_0$ until time $T_1$ (at the end of the reflective portion 52 of the PWM cycle 50) in which the pixel cell remains in the reflective state. At the conclusion (time $T_1$) of the reflective portion 52, the pixel cell transitions to its non-reflective state (to begin the non-reflective portion 54) until the end of the PWM cycle 50 at time $T_2$.

The duration of the PWM cycle 50 depends on the configuration of the projection display system. For the single LC SLM panel-configuration of the projection display system 10 (FIG. 1), the PWM cycle time is equal to a multiple of one sixth of the field time interval (1/60 seconds). The multiple may be set as desired to mitigate color breakup, a visual artifact associated with temporal color sequential displays. PWM cycle times may be at 1/240 Hz, 1/360 Hz, and so on. Each pair of PWM cycles is dedicated to an illumination color primary (red or green or blue). One PWM cycle asserts a first voltage polarity and the second PWM cycle asserts the opposite voltage polarity while driving the pixel cell to establish the pixel intensity (such as the PWM cycle 50). More specifically, the second PWM cycle should assert the bright state for the same duty cycle duration as the first PWM cycle, except that the voltage field across the LC material is reversed in polarity. Additionally, the reflectivity state sequence in the second PWM cycle may proceed in the reverse time order of the driving PWM cycle.

Using the retrieved value from the LUT 38, the processor 32, in accordance with some embodiments of the invention, utilizes the corresponding PWM count to time the duration of the PWM cycle for the respective pixel by means of the video data interface 31 (FIG. 3).

Figure 5:
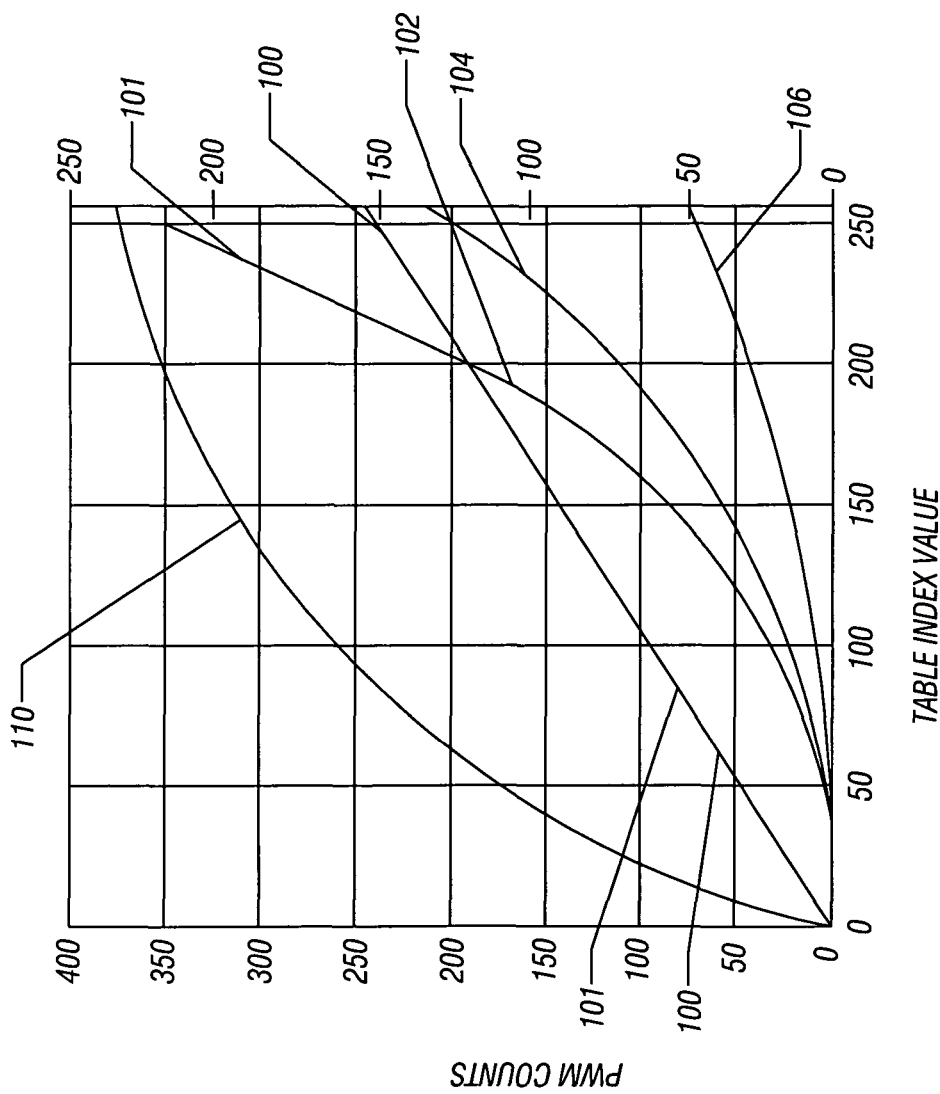
FIG. 5 depicts relationships between pixel intensities and a table index value.

Referring to FIG. 5, in some embodiments of the invention, the entries of the LUT 38 (FIG. 3) establish a relationship between the PWM counts and the received video data values (represented by "table index values" in FIG. 5). For example, the LUT 38 establishes, in conjunction with other features of the display projection system 10 described below, relationships between the video data values and the pixel intensities that appear in the projected image. However, the video data that is furnished to the projection display system 10 may not have a linear relationship to the pixel intensities that are required for the projected image because the video data may be pre-compensated to drive a non-linear cathode ray tube (CRT) display, for example.

More specifically, the video data that is furnished to the projection display system 10 (FIG. 1) may be pre-compensated to accommodate the non-linear responses of phosphors of a CRT display. Thus, a conventional CRT display receives the pre-compensated video data and directly drives the CRT tube with this data. However, for a SLM display system, such as the projection display system 10, the pre-compensation must be removed from the video data. Therefore, the relationship between the video data and the PWM counts should not be linear, but rather, should be non-linear in a manner that removes the CRT pre-compensation and applies gamma compensation appropriate for the SLM in the projection system. The correct gamma compensation required will depend on the voltage to reflectance transfer characteristics of the SLM as well as the application. For office displays, it is common to drive to a final optical gamma of 2.2, while for home theater, it is more common to drive to a final optical gamma of 2.5.

More specifically, still referring to FIG. 5, system 10 may establish a non-linear relationship between the video data that is furnished to the system 10 and the PWM clock counts. A curve 106, for example, represents the needed relationship imposed by the LUT 38 between the blue component video data and the blue SLM PWM count; a curve 104 represents the needed relationship between the green component video data and the green SLM PWM count; and a curve 102 represents the needed relationship between the red component video data and the red SLM PWM count.

As can be seen from FIG. 5, for the darker video levels (i.e., the smaller table index values), the compensated PWM count increases at a slower rate than for the brighter pixel intensity values (i.e., the larger table index values). The PWM clock count resolution (and thus, the video grayscale resolution, as appears in the projected image), may be determined by the minimum PWM cycle clock duration is that required to form intensity changes that are small enough to be below the visual contouring threshold for the darkest tones. Because the PWM clock resolution also establishes the duration of the time segment 51 (see FIG. 4), the smaller the duration of the time size 51, the higher the frequency of the needed clock frequency. This may present challenges, in that a high clock frequency means a higher power consumption.

Referring back to FIG. 3, the electrical system 30 further includes duty cycle altering components 35. These components enable the duty cycle to be selectively altered. In some embodiments of the present invention, it may be desirable to periodically reduce the duty cycle, particularly for darker relative to lighter pixels. This enables an increase in bit depth, in some embodiments, without requiring any kind of performance increase. Thus, a bit depth improvement may be achieved, in some embodiments, cost effectively.

In one embodiment, the duty cycle may be altered from frame to frame, adding more gray control. For example, a duty cycle variation may be implemented from a 50% duty cycle, for example, on even frames to a 40% duty cycle on odd frames. However, in some embodiments, the lookup table 38 may be extended to contain a set of n values having a range 0 to n−1. Thus, small changes may be made to the duty cycle across different fields. For example, different ranges may be used for values in the table. In some embodiments, a positive range may be used that also includes zero. In the illustrated embodiment, the duty cycle may be selectively reduced by 0 to 10% and, specifically, 0, 2, 5, or 10%.

Advantageously, the range may contain relatively small numbers to reduce the amount of frame to frame change that is introduced. For example, the maximum extent of the duty cycle variation may be maintained under 25% in some embodiments of the present invention.

In some embodiments, additional values may be added to the mappings for a given pixel value in specific frames, allowing effective control of the modulation and improved bit density. However, it is also possible to use a subtraction or other arithmetic alteration schemes.

Figure 6:
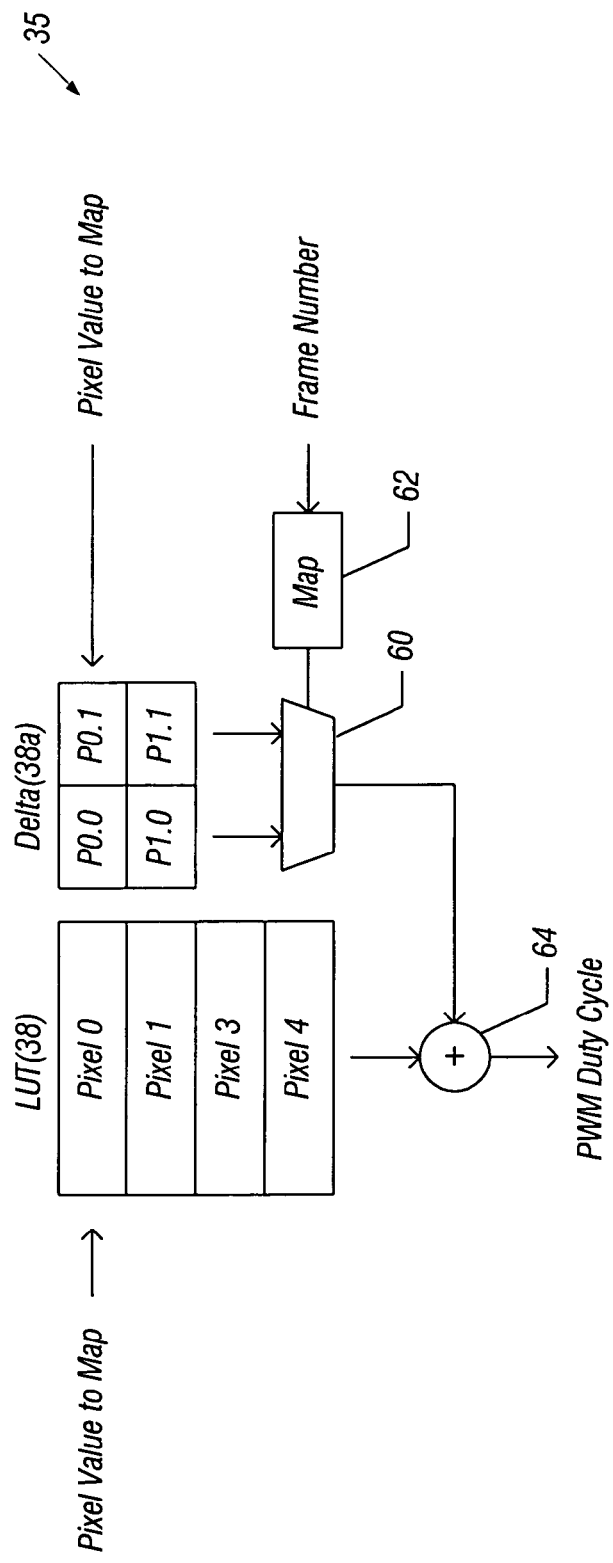
FIG. 6 is a schematic depiction of the duty cycle modulating scheme in accordance with one embodiment of the present invention.

Referring to FIG. 6, the components 35 may include a selector 60 controlled by a map function 62. The map function 62 receives a frame number for the frame to be currently displayed. The lookup table or LUT 38 includes the values for various pixels, only four of which are shown. The pixel value to map is received from the processor 32 in some embodiments. Thus, the pixel value to map points to a particular pixel value in the LUT 38 and also to a particular pixel data in the delta memory 38a. Thus, for the pixel 0, there are two values in this example. One being the pixel value 00, which indicates no change in the duty cycle and the pixel value 01, which indicates a reduction of the duty cycle by 10%. The selector 60, based on the map function 62, changes or does not change the duty cycle from the 50% duty cycle. Of course, the duty cycle for the base value (which is to be altered) may have values other than 50%.

Generally, the delta is only applied at the lower intensity levels in particular frames. Thus, for example, the duty cycle may be reduced on odd frames for their lower intensity values. As one example, only the lower two intensity values may be subject to duty cycle alteration.

Returning to the example shown in FIG. 6, after looking up the values in the lookup table 38 and the delta table 38a, if the pixel value is 1, the LUT 38 returns the pixel value 1 line while the delta table 38a returns the pixel value 10 or 11 entries. The selector 60 then uses the map function 62 to select one of the two delta table entries. In this case, pixel value 10 or 11 is to be added to the LUT entry to arrive at the final duty cycle mapping.

The map function 62 may implement any of a variety of different functions. The simplest function is a modulo function that simply does a mod n on the frame number. Applied to this example, the map function 62 (implementing mod n) returns 0 for even frames and 1 for odd frames, to select either the 1 or 0 entries in the delta table 38a.

Figure 7:
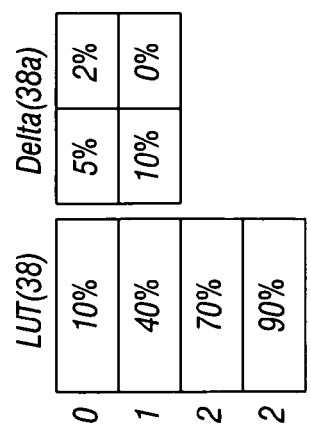
FIG. 7 is a timing diagram showing the duty cycle for a pixel and an altered duty cycle for the pixel in a different frame.
Figure 7:
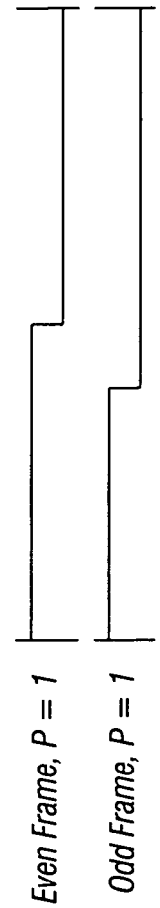

Then, referring to FIG. 7, in the simple mod n example, the delta table 38a may have variations from 0 to 10%, including intermediate levels of 2% and 5%. The duty cycle percentages are indicated instead of the raw counts for simplicity of illustration. The left side of FIG. 7 illustrates the PWM waveform that the hardware would produce for pixel value 1 on even and odd frames using the modulo mapping functions as the map function 62. Thus, the even frames with pixel values of 1 have a 50% duty cycle, while odd frames with the same pixel value have a 40% duty cycle.

The modulo function may introduce artifacts because the given delta is always added at a periodic rate. This may introduce flicker other undesirable artifacts. To reduce these artifacts, a more complex function may be used. In one embodiment, the order in which to apply the n delta entries every n frame is randomly altered. In this way, an entry 0 does not always occur at the same point in a group of n frames. Then, the map function 62 can be built with a small pseudo-random generator (not shown) that randomizes a rename table to index into the delta entries. The rename table maps frame numbers onto delta entries.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   pulse width modulating the duty cycle of a light beam to establish a pixel intensity; and
   varying the duty cycle between two frames by reducing the duty cycle in at least two successive even frames by a first amount and in at least two successive odd frames by a second amount different than said first amount.

2. The method of claim 1 including reducing the duty cycle for a darker pixel relative to a lighter pixel.

3. The method of claim 1 including varying the duty cycle in a successive frame.

4. The method of claim 1 including alternating between two duty cycles in successive frames.

5. The method of claim 4 including providing a 50% duty cycle for a first set of frames, and reducing the duty cycle in another set of frames.

6. The method of claim 5 including reducing the duty cycle between about 2 and about 10%.

7. The method of claim 1 including alternating the duty cycle using a modulo function.

8. The method of claim 7 including providing a lookup table to determine how to reduce the duty cycle.

9. The method of claim 8 including providing different intensity values for different pixels and adjusting the duty cycle based on a frame number.

10. A projection display comprising:
    a spatial light modulator; and a device to periodically reduce the duty cycle of pulse width modulation between two frames for darker relative to lighter pixels.

11. The display of claim 10 wherein said device to reduce the duty cycle for a darker pixel relative to a lighter pixel.

12. The display of claim 10 wherein said device to vary the duty cycle in successive frames.

13. The display of claim 12 wherein said device to change the duty cycle in every other frame.

14. The display of claim 10 wherein said device to alternate the duty cycles in successive frames.

15. The display of claim 14 wherein said device to provide a 50% duty cycle in a first set of frames and reduced duty cycles in another set of frames.

16. The display of claim 15 wherein said device to reduce the duty cycle selectively between about 2 and about 10%.

17. The display of claim 10 wherein said device to implement a modulo function to reduce the duty cycle.

18. The display of claim 17 wherein said device includes a lookup table to determine how to reduce the duty cycle.

19. The display of claim 18 wherein said device to provide different intensity values for different pixels and adjust the duty cycle based on the frame number.

20. A spatial light modulator comprising:
a modulating panel; and
a device to vary the duty cycle of pulse width modulation of said modulator between successive frames by reducing the duty cycle in at least two successive even frames by a first amount and in at least two successive odd frames by a second amount different than said first amount.

21. The modulator of claim 20, said device to reduce the duty cycle for a darker pixel relative to a lighter pixel.

22. The modulator of claim 20, said device to vary the duty cycle in successive frames.

23. The modulator of claim 22 wherein said device to change the duty cycle in every other frame.

24. The modulator of claim 20, said device to alternate the duty cycles in successive frames.

* * * * *